(12) United States Patent
Miller

(10) Patent No.: US 9,118,603 B2
(45) Date of Patent: Aug. 25, 2015

(54) SYSTEM AND METHOD FOR MANAGING ATTEMPTED ACCESS OF OBJECTIONABLE CONTENT AND/OR TAMPERING WITH A CONTENT FILTERING DEVICE

(71) Applicant: Edward Blake Miller, Fort Lauderdale, FL (US)

(72) Inventor: Edward Blake Miller, Fort Lauderdale, FL (US)

( * ) Notice: Subject to any disclaimer, the term of this patent is extended or adjusted under 35 U.S.C. 154(b) by 306 days.

(21) Appl. No.: 13/789,741

(22) Filed: Mar. 8, 2013

(65) Prior Publication Data

US 2014/0258528 A1    Sep. 11, 2014

(51) Int. Cl.
  *G06F 15/173*  (2006.01)
  *H04L 12/911*  (2013.01)
  *H04L 12/28*  (2006.01)
  *H04L 29/06*  (2006.01)

(52) U.S. Cl.
  CPC ............ *H04L 47/70* (2013.01); *H04L 12/2869* (2013.01); *H04L 12/2898* (2013.01); *H04L 63/0263* (2013.01); *H04L 63/1408* (2013.01)

(58) Field of Classification Search
  CPC ...................................................... H04L 47/70
  See application file for complete search history.

(56) References Cited

U.S. PATENT DOCUMENTS

| | | | |
|---|---|---|---|
| 6,493,752 B1 * | 12/2002 | Lee et al. ...................... | 709/223 |
| 6,947,985 B2 | 9/2005 | Hegli et al. | |
| 7,194,464 B2 | 3/2007 | Kester | |
| 8,010,552 B2 | 8/2011 | Kester | |
| 8,359,642 B1 | 1/2013 | Wurtenberger et al. | |
| 8,924,999 B1 * | 12/2014 | Santangelo et al. ............ | 725/25 |
| 2002/0073335 A1 * | 6/2002 | Shuster ......................... | 713/201 |
| 2002/0178381 A1 * | 11/2002 | Lee et al. ...................... | 713/201 |
| 2005/0015624 A1 * | 1/2005 | Ginter et al. .................. | 713/201 |
| 2006/0002331 A1 * | 1/2006 | Bhagwat et al. .............. | 370/328 |
| 2006/0095965 A1 * | 5/2006 | Phillips et al. ................. | 726/22 |
| 2006/0182103 A1 | 8/2006 | Martini et al. | |
| 2007/0093259 A1 | 4/2007 | Hyatt | |
| 2008/0209057 A1 | 8/2008 | Martini et al. | |
| 2008/0282338 A1 * | 11/2008 | Beer ............................... | 726/12 |
| 2009/0013210 A1 * | 1/2009 | McIntosh et al. ................ | 714/4 |
| 2010/0097225 A1 * | 4/2010 | Petricoin, Jr. ............... | 340/573.1 |
| 2011/0047388 A1 | 2/2011 | Park et al. | |
| 2011/0078309 A1 * | 3/2011 | Bloch et al. ................... | 709/224 |
| 2011/0307513 A1 | 12/2011 | Kester et al. | |
| 2013/0017791 A1 | 1/2013 | Wang et al. | |
| 2014/0012978 A1 * | 1/2014 | Moussavian et al. .......... | 709/224 |
| 2014/0101748 A1 * | 4/2014 | Ancona et al. .................. | 726/12 |

FOREIGN PATENT DOCUMENTS

EP    1591371    11/2005

* cited by examiner

*Primary Examiner* — June Sison
(74) *Attorney, Agent, or Firm* — Weitzman Law Offices, LLC

(57) ABSTRACT

An apparatus and method for managing a user's ability to access content on the Internet involves a reporting and control server, an Internet Access Control (IAC) device, the IAC device including at least one light to indicate when at least one disallowed event has occurred, and a reset component which, for the at least one light to be reset, must be coupled to the IAC device. The method involves receiving a web address, determining whether a requested Domain Name System (DNS) server is an acceptable DNS server, determining whether an IP address provided by the acceptable DNS server is a redirect IP address and, if so, indicating an objectionable content event has occurred by changing a state of at least one light on the IAC device, sending information so that a reporting and control server can transmit a reset, receiving the reset, and resetting the at least one light.

20 Claims, 9 Drawing Sheets

SYSTEM AND METHOD FOR MANAGING ATTEMPTED ACCESS OF OBJECTIONABLE CONTENT AND/OR TAMPERING WITH A CONTENT FILTERING DEVICE

FIELD OF THE INVENTION

The present invention generally relates to computing and more particularly to Internet content filtering.

BACKGROUND

The Internet has become an essential part of home life and provides a source of new content to a vast number of homes across America and the world. While often, the content brought into a home is considered acceptable by all members of the family, often times, content is brought in which may be considered objectionable or inappropriate for certain member(s) of the household. As a result, content filtering software and devices have been devised that provide for a way to control or limit access to such content. Unfortunately however, such software and/or devices can often be circumvented, for example, by persons with access to the filtering device physically bypassing the device or through gaining access to the administrator's password and modifying the restrictions in effect for one or more users and then changing the restrictions back after the access has occurred or modifying the file in which the improper access is logged.

In some cases, doing so will result in the administrator having no way of knowing about the bypass or modification. Moreover, for relatively computer-unsophisticated users, like some heads of households, even the means by which one is informed of attempts to access objectionable content are somewhat technical and, to avoid access by others, may require the user to use yet another different login and password. In addition, such software and/or hardware generally require active effort on the part of the administrator/head(s) of the household to investigate, even if some form of mechanism is included whereby an alert of improper access is/has been attempted.

Moreover, content filtering systems for the home are often pure software solutions that tend to slow down the system.

Although hardware-based content filters generally exist and do not tax the user's system at all or near as much as a pure software filter running on a user's computer will, hardware-based content filters are generally costly and designed for large scale business operations that typically have, or have ready access to, trained IT personnel who can set up and administer the system as part of their regular job duties. Administering such a system is typically well beyond the ken of many computer-unsophisticated users small business and/or home users.

SUMMARY

Therefore, Internet content filter users have a need for a more passive, turn-key content filtering system that reduces the burden on the user's computer and is not easily bypassed. Such a system, as described herein, fills this need and advantageously also provides a conspicuous indication or notice to the relevant person that objectionable content was sought and if there was any attempt to bypass or tamper with the filtering device. Indeed, if the indication is made visible on the device itself and can not be reset by the non-administrator/head of the household, such a conspicuous indication can provide the advantage that it may inherently serve as its own form of deterrent, since the result of the attempt can be readily observed by members of the household.

One aspect involves an apparatus for managing a user's ability to access certain content on the Internet. The apparatus includes a reporting and control server and an Internet Access Control device remote from the reporting and control server. The Internet Access Control (IAC) device has a first interface and a second interface. The first interface is coupled to a modem of the user that is configured to provide access to the Internet and the reporting and control server. The second interface is coupled to a computer from which access to the Internet may be sought. The Internet Access Control device has internal programming and control to control its operation, with the internal programming and control being inaccessible except via actions communicated by the reporting and control server. The Internet Access Control device is only able to communicate with the reporting and control server via the Internet. The Internet Access Control device includes at least one light which will be visible to a person from a distance external to the Internet Access Control device when the at least one light is lit, the at least one light being configured to conspicuously indicate at least one disallowed event has occurred. The Internet Access Control device is configured to interact with a Domain Name System (DNS) server to determine whether a disallowed event has occurred and interact with the reporting and control server to provide a notification of an existing disallowed event. The apparatus also includes a reset component coupleable to the Internet Access Control device and which must be coupled to the Internet Access Control device in order for the at least one light to be reset after the existing disallowed event has occurred.

Another aspect involves a method of managing a user's ability to access certain Internet content using a device connected between the user's computer and a modem connected to the Internet. The method involves receiving a web address from the user's computer requesting content to be obtained via the modem from a website, indicated by the web address. The method further involves determining whether a requested DNS server to which the web address is directed corresponds to at least one DNS server that is identified in storage as an acceptable DNS server so that (i) if the requested DNS server is not identified in the storage as acceptable, the web address will be blocked, and (ii) if the requested DNS server is identified in the storage as acceptable, the web address will be sent to the acceptable DNS server via the modem.

The method also involves determining whether an IP address provided by the acceptable DNS server is a redirect IP address and, if the IP address is the redirect IP address, indicating that an objectionable content event has occurred by illuminating at least one light on the device.

The method additionally involves sending information to a reporting and control server, via the modem, so that the reporting and control server can issue a notification to a notification recipient for the device, receiving reset information from the reporting and control server, and following the receiving of the reset information, resetting the at least one light on the device.

The foregoing and following discussion outlines rather generally the features and technical advantages of one or more embodiments of this disclosure in order that the following detailed description may be better understood. Additional features and advantages of this disclosure will be described herein and may be the subject of claims of this application.

DETAILED DESCRIPTION

Figure 1:
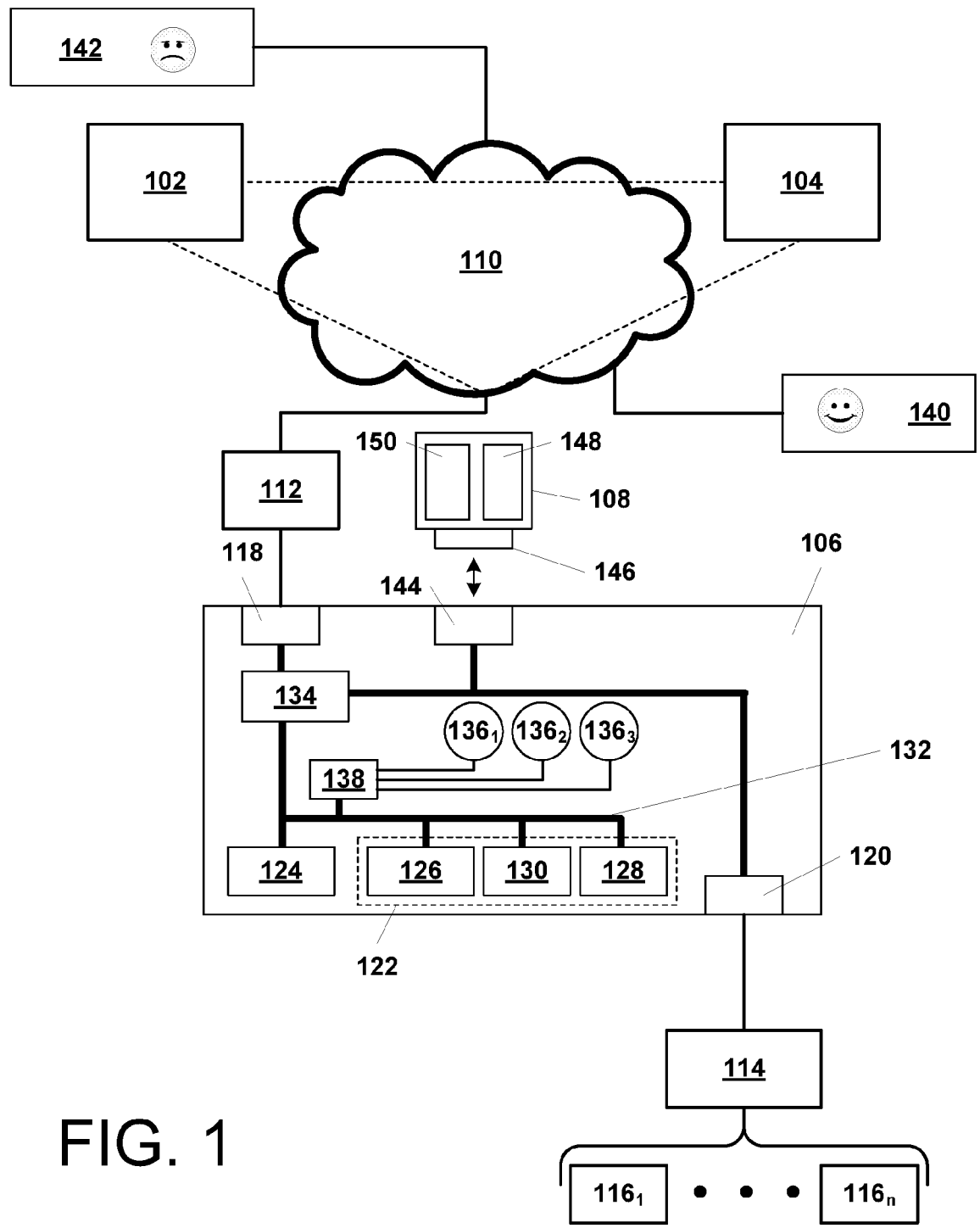
FIG. 1 illustrates, in simplified form, one example arrangement incorporating the approaches described herein.

In simplified overview, a system and method are described herein which involve monitoring outgoing Internet traffic to check for signs that an attempt to access objectionable content has been made and/or can optionally check for changes to its own situation that are indicative of tampering and provide an indication thereof and an approach to controlling resetting of the indication.

Advantageously, the approach described herein is "turnkey" for the user in the sense that it need not require any software to be running on the computer(s) subject to the filtering, and does not need any special administration by the owner, making it almost foolproof for even the most unsophisticated user. Moreover, where a visual indicator is provided on the device itself, the system and method provides for a way for the administrator to reset the visual indicator in a simple and effective manner suitable for even the most unsophisticated user. Still further, depending upon the particular implementation, the ability to reset is highly limited such that it too is not readily subject to easy tampering or bypass.

More notably, the device and method operate such that neither the user nor the authorized administrator has the intentional ability to directly access a device operating as described herein. In other words, unlike conventional routers, some cable modems and hardware content filtering devices which afford a user or administrator some degree of access to, or ability to alter, the internal programming or operation, most implementations employing the approach described herein will not be user-addressable, thereby affording the user no ability to access or alter the programming of the working internals of any device that is part of the implementation or to directly change its operation, thereby reducing, if not eliminating, the possibility of "hacking" such implementations without extraordinary effort. Indeed, it is preferable (but not necessary or required for any particular implementation) that the device that is installed between a user's computer and the Internet (once installed and registered as described herein) will only be accessible to anyone, even service personnel, indirectly via an external control server who are on a local network with that control server.

In one example implementation, the device and method are configured to notice an attempt to access objectionable content through interfacing with a DNS server that provides the bulk of the filtering itself. When a user, within the purview of the device, attempts to access any web page, the request for such a web page is sent to the DNS server, which, as is the case with any DNS server, must relate the human-readable address and convert it to a unique IP address. Should the web page request lie within those classified as objectionable, the DNS server will redirect the user to a different address indicating that the page is blocked. The device detects this redirection, records it, and optionally provides a visual indication to the user on the device, for example, by turning on one or more LED(s) on the device. The indication on the device must then be reset by the designated administrator receiving a separate notice and then taking a simplified action to which they may only be privy. By way of representative example, they may receive an e-mail to which they must specifically reply or containing a unique link to which they must go. By taking the specified action a reset will be triggered. In similar alternative example to the e-mail approach, they might receive an SMS (i.e. "text") message to which they must similarly reply or which may contain a link which must be visited to cause a reset.

With another alternative example, when obtained, the device may have an associated component which the administrator may use to effect a reset of the device by attaching it to the device. With this example, only the person possessing the component can effect the reset.

In another example implementation, the device and method are configured to provide an indication that tampering may have occurred. This is accomplished by recognition of the fact that, for the user to access any external webpage on the Internet, the system generally requires at least two connections: a connection to the Internet (which is generally considered herein to be the Internet side of a modem, be it a dial up modem, cable modem, fiber optic modem or other such device); and a connection to the home network (which is the side of the modem to which a connection is ultimately made to the user(s) computer(s) and may, in the simplest case, be simply the wire directly connecting the user's computer to the modem). Once both of these connections are established, any loss of either of these connections is considered tampering. In this way, if any of the cables to the device are unplugged, the device is considered to have been tampered with and the content/tampering indication will be set and remain set until reset/deactivated by the appropriate person in the limited, specified manner, such as noted in the examples above.

Until such time as the device is reset, all members of the household (or persons who have physical access to the device) can observe that some unsanctioned activity has occurred.

Depending upon the particular implementation, the specific deactivation of the notification indicator may occur through interfacing with a Reporting and Control Server which might (or might not originate) the e-mail or SMS message, but would likely be the reply addressee or link destination contained in the e-mail or SMS message. In implementations involving a "reset" component, the reset might be accomplished merely by connecting the proper device or through a mechanism by which connecting the component initiates some interaction with the Reporting and Control Server.

Advantageously, with the approaches described herein, the simplicity of the system is maintained and the owner does not need to recall any new login names and passwords.

Furthermore, in implementations involving replying to an e-mail or SMS message, the owner of the system also establishes their acknowledgement of past recorded events.

Likewise, in implementations involving a reset component, only the possessor of the component can effect the reset, thereby ensuring that if the administrator possesses the component, the user who triggered the notification cannot effect a reset.

With the foregoing overview in mind, specific details will now be presented, bearing in mind that these details are for illustrative purposes only and not intended to be exclusive.

FIG. 1 illustrates, in simplified form, one example arrangement 100 incorporating the approaches described herein.

As shown in FIG. 1, for purposes of explanation only, the arrangement 100 involves, one or more DNS server(s) 102, a Reporting and Control server 104, an Internet Access Control device 106, and optionally a reset component 108 which will be described in greater detail below. The DNS server(s) 102, Reporting and Control server 104 and IAC device 106 communicate with each other via communication paths through, for example, the Internet 110 (although, depending upon the implementation, the Reporting and Control server 104 can be part of one of the DNS server(s) 102 or can be on a local network or bus with one of the DNS server(s) 102 such that communication between them may not involve the Internet 110).

As shown in FIG. 1, the IAC device 106 is installed at the user's premises between the user's modem 112 they use to connect to the Internet (for example, either directly or via a Wide Area Network (WAN) or Local Area Network (LAN)) and, in the case where multiple computers $116_1$-$116_n$ share the modem 112, a router 114. Of course, with a single computer configuration a router might not be present, so a user's computer $116_1$ would be directly connected to the IAC device 106 in that case. In this configuration, irrespective of the computer $116_1$-$116_n$ involved, all requests to and content from the Internet that passes through the modem must travel through the IAC device 106. At this point it should be noted that, as used herein, reference to the user's computer 116 is intended to include any type of device that may be used to connect to the Internet 110 via the modem 112 or router 114, which, in addition to personal computers, may include, but is not limited to, tablet computers, smart phones, gaming consoles, portable media players, and Internet-capable televisions, to name a few examples. Thus, provided that access to the Internet 110 is sought via the modem 112, objectionable Internet content can be intercepted by implementations of IAC devices as described herein.

Looking further to some simplified details of the IAC device 106, consistent with the above, the IAC device includes at least two interfaces 118, 120. The first interface 118, is the Internet-side interface 118, which typically will be an Ethernet, USB, fiber optic or coaxial cable, which is connected to the modem 112 and carries signals to and from the modem 112. Depending upon the particular case, the modem 112 may be, for example, a carrier supplied or user-owned cable modem, DSL modem, or optical network terminal (for fiber optic networks). The second interface 120, is the interface to which the IAC device 106 ultimately connects to the user computer(s) $116_1$-$116_n$ and will typically be a LAN or local network interface which, depending upon the particular implementation will also be, for example, Ethernet, USB, optical fiber, coaxial cable, or other suitable interface compatible with connecting to the router 114, if present, or the appropriate interface of the user's computer $116_1$ for the single computer case.

At this point it is worth noting that, with this configuration, if more than one user computer is involved, irrespective of the number of user computers involved $116_1$-$116_n$ on the one hand, only one IAC device 106 is necessary, but on the other hand, absent additional features being incorporated into the IAC device 106, it is generally not possible to discern which specific computer $116_1$-$116_n$ triggered the notification.

Between the two interfaces 118, 120, the IAC device 106, will typically include memory 122 and a processor 124. Depending upon the particular implementation, the memory 122 may include program and/or other non-volatile read/write storage 126, as well as RAM 128 and ROM 130. The processor 124 is configured to access the storage 122, for example via a system bus 132, and acts under program control to monitor Internet traffic passing though the system and compare such traffic against patterns and information contained within memory 122. The memory 122 may also store log files and other programming and files necessary for the operation of the IAC device 106. Optionally, or alternatively, the IAC device 106 may make use of one or more state machines, the construction of which is well known in the art, to the same or similar effect to reduce the work done by or obviate the need for a conventional processor like a microprocessor. As such, as used herein, the "processor" 124 is intended to include both conventional processors and one or more such state machines. The IAC device 106 also includes I/O control circuitry 134 to facilitate passage of signals between the two interfaces 118, 120 and allow the processor 124 to analyze and affect the signal's passage and/or its destination.

Of course the IAC device 106 will also have a connection to a source of power which, depending upon implementation and power requirements, can come from line power (typically via a transformer), battery power (internal or external, rechargeable or not), obtain power through one or both of its interfaces 118, 120, or obtain power from some other internal or external source.

Finally, the IAC device 106 includes one or more indicator lights 136 and associated driver circuitry 138. The one or more indicator lights 136 will typically be LEDs and are placed such that, when lit, they are conspicuously viewable outside whatever housing contains the interfaces 118, 120, memory 122, processor 124 and other associated circuitry. Depending upon the particular implementation, a single indicator light 136 can be used to indicate both an attempt to access objectionable content and tampering. In the simplest case, if either occurs, the light can simply be lit. Alternatively, through programming and the use of more sophisticated driver 138 circuitry, it is possible to indicate differently an attempt to access objectionable content and tampering by using, for example, a continuous lit light for one and a pattern of flashes for the other or two or more different flash sequences.

As shown, the example IAC device 106 of FIG. 1 includes three indicator lights $136_1$, $136_2$, $136_3$. With this configuration, many more notification possibilities are available. For example, in the simplest case, each light can have a different purpose, such as, for example, the central light $136_2$ may be lit when the interface 118 is connected and the IAC device 106 is able to communicate with the Reporting and Control Server 104, the rightmost light $136_3$ may be lit when the interface 120 is connected to the router 114 or user computer(s) 116. Finally, the leftmost light $136_1$ may be used as the content/tampering light that is lit when an attempt is made to tamper or circumvent the device or access a web page 142 with content deemed objectionable as opposed to an acceptable web page 140.

Alternatively, if each of the three lights is individually used as one bit of a three bit binary number, then eight notification "states" are possible from a binary 000 to 111. If one adds in the possibility of one or more lights being able to flash, the number of possibilities goes up significantly, albeit so does the deciphering complexity for the user.

In any event, irrespective of the number of lights or whether any one or more are continuously lit or flash in some pattern to provide the notification, it is intended that the content/tampering light(s) provide conspicuous, continuing notification to the user (until reset by the administrator) that, for example, any one or more of the following events has occurred:

1. An attempt was made to access a web page 142 with objectionable content.

2. An attempt was made to circumvent the chosen DNS server(s) 102.

3. An attempt was made to disconnect the IAC device 106 from at least one of its two interfaces 104 and 109 or by removing its power.

Optionally, as mentioned previously, the IAC device 106 may also be configured to make use of a separate reset component 108 to effect a reset of the notification light(s) 136. When this is the case, the IAC device may also include a port or interface 144 to which the reset component 108 can connect via a complementary mating interface 146 on the reset component 108. Alternatively, with some IAC device 106 implementations, one of the interfaces 118, 120 may serve as the port or interface 144 instead of having a separate port or interface for such purpose. With other implementations, the interfaces 144, 146 need not be physically complementary but need only be communicatively complementary, for example, if capacitive coupling or RFID components are used.

In addition, depending upon the particular implementation, the reset component 108 may have within certain relatively unique information that can be read by, or presented to, the IAC device 106 for identification purposes so that it can be presumed that a reset is intended. This information can take many forms, the specific one that is used being largely one of design choice, not operational need. For example, the reset component 108 may be a "read only" device containing, in the simplest case, a simple identifier stored within the reset component 108 that is readable by the IAC device 106. A more complex reset component 108 may include storage 148 that can be written to or read by the IAC device 106. Yet a more complex reset component 108 can include a processor 150 which can allow the reset component 108 to have some level of "smarts" or programmability. With these more complex reset components 108, the capability can be provided to, for example, periodically change the identifier, have the identifier be a value calculated within the reset component 108 itself or store other information for later retrieval or use by any of the IAC device 106, the Reporting and Control server 104 or the administrator. One example of a device suitable for use as a read only or read/write reset component 108 is a USB, SD or other conventional form factor storage drive. Another example of a device suitable for use as a reset component 108 is a USB storage drive that also includes processing capability. A further example device suitable for use as a reset component 108 is a special purpose hardware device containing circuitry (and possibly processing capability) that has been specifically designed for or adapted to that purpose.

Figure 2:
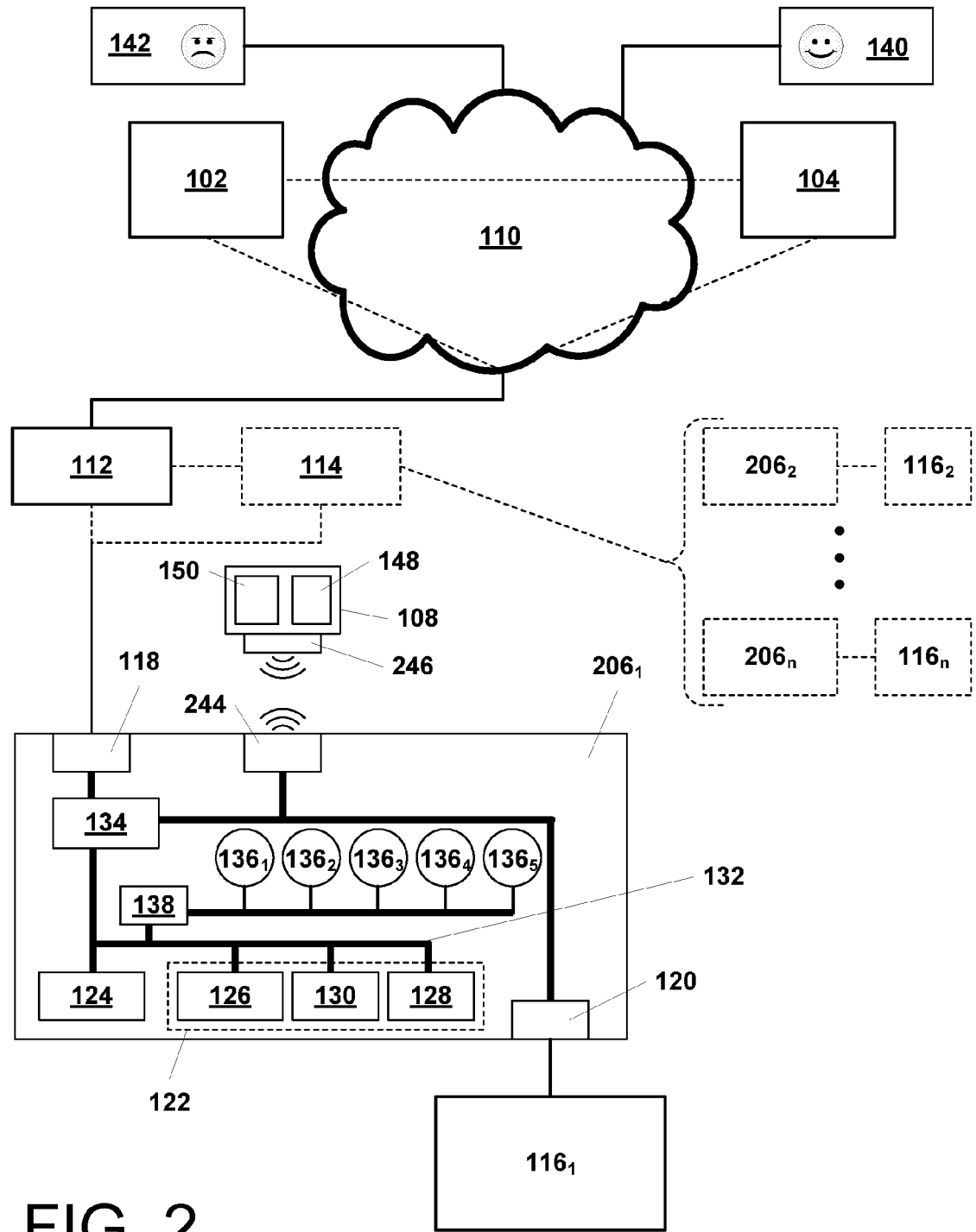
FIG. 2 illustrates, in simplified form, an alternative configuration similar to the configuration of FIG. 1.

FIG. 2 illustrates, in simplified form, an alternative configuration similar to the configuration of FIG. 1 except that the IAC device 206 of FIG. 2 includes five lights $136_1$, $136_2$, $136_3$, $136_4$, $136_5$, interfaces 244, 246 used for communication between the optional reset component 208 and the IAC device 206 are wireless interfaces, and the computer $116_1$ has its own IAC device 206 connected between it and either the modem 112 or router 114 (as desired or appropriate) or, if multiple computers $116_2$-$116_n$ are present, each can have its own IAC device $206_1$-$206_n$ between it and the router 114 (or alternatively, some computers can share a single IAC device as in FIG. 1 while others have their own IAC device 206).

The operation of the IAC device 106, 206 to detect and provide notification of an attempt to access objectionable content or tampering will now be described with reference to different scenarios. After the operation is described, the different approaches to effecting a reset will be described.

As briefly noted above, on the Internet 110 side of the modem 112, in addition to websites which a user may seek to reach from a computer 116, are the DNS server 102 and the Reporting and Control Server 104. The DNS server 102, like all DNS servers, translates human-readable web-addresses into the unique IP address of the desired web site. The Reporting and Control Server 104 operates to interact with the IAC device 106, 206 to accomplish tasks as described herein. The IP address of the Reporting and Control Server 104 is specifically known to the IAC device 106, 206 to facilitate communication between it and the Reporting and Control server 104 in any of several scenarios.

For example, if a user of a computer 116 attempts to access objectionable content, this is identified by the DNS server 102 and it sends information back to the IAC device 106, 206 which will trigger activation of the appropriate notification light(s) 136. Note that, in implementation, to ensure availability, the DNS server 102 of FIG. 1 and FIG. 2 may actually be one server selected from a specific list of acceptable DNS servers in the IAC device 106, 206 so that, if one is not available for some reason, one or more alternates will be. For purposes of understanding, any such alternate DNS servers should be considered a DNS server 102 as described herein.

Thus, in another example, a user of a computer 116 may attempt to circumvent the content filtering by attempting to avoid use of the chosen DNS server 102, which is chosen for its ability to redirect web requests for web pages with objectionable content away from the original requested destination and point the browser of the user's computer 116 to another page, typically one that indicates that such content is blocked. The user may attempt to go around such filtering by changing the DNS server to which their browser will connect to one that does not filter content, for example Google's DNS server. This is a common means to circumvent DNS-based content filtering solutions. The IAC device 106, 206 prevents this exploit by internally forcing only the chosen DNS server 102 designated in the IAC device 106, 206 to be used. Thus, an attempt to use any alternate DNS server (i.e. one that is not identified in the AC device 106, 206) is considered to be a tampering or an objectionable content access attempt and will trigger activation of the appropriate notification light(s) 136.

Although an attempt at bypassing the DNS server 102 or accessing objectionable content are considered events which will trigger activation of the appropriate notification light(s) 136, advantageously, implementations of the IAC device 106, 206 can optionally readily include features which allow for an exemption file to be sent by the Reporting and Control server 104 to, and stored on, the IAC device 106, 206 so that any action(s) identified in the exemption file, if they occur, will be deemed "allowed" and, thus, will not result in triggering activation of the appropriate notification light(s) 136. The process for obtaining this file and examples of how it can be used is explained in greater detail below.

Figure 3:
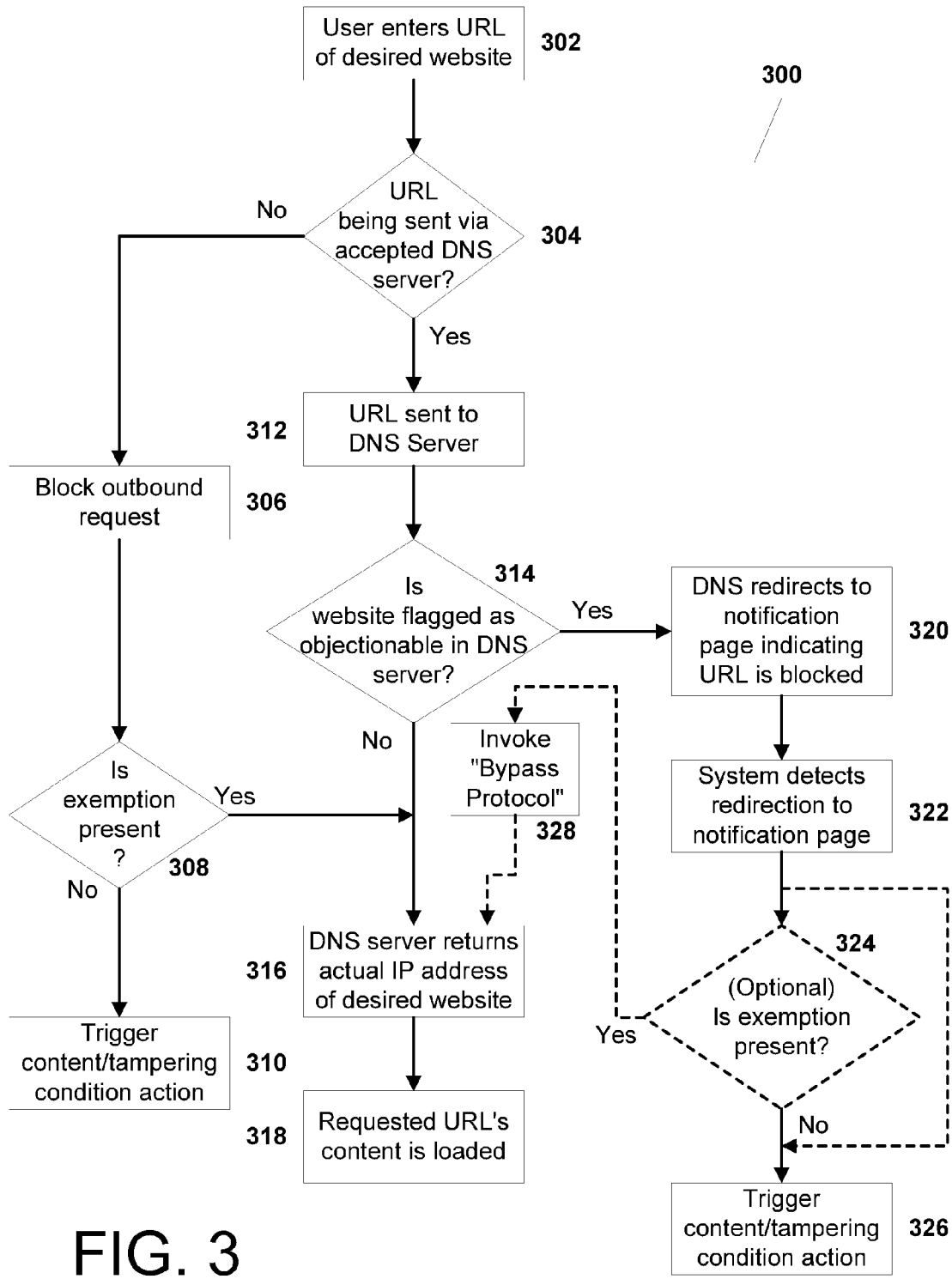
FIG. 3 is a simplified flow chart of one example overview of a process which is implemented via programming of the IAC device, DNS server and Reporting and Control server.

With continuing reference to the configurations of FIG. 1 and FIG. 2, FIG. 3, is a simplified flow chart of one example overview of a process 300 which is implemented via programming of the IAC device 106, 206, DNS server 102 and Reporting and Control server 104 illustrating the interactions of those various items when a user attempts to access a website 142 with objectionable content via a computer 116 located "behind" the IAC device 106, 206. The process begins when a user enters a "human-readable" web address into their computer 116 (Step 302). That web address passes into the IAC device 106, 206 for forwarding to a DNS server for translation into its corresponding IP address. The IAC device 106, 206 inspects the destination DNS server and compares it to the acceptable DNS server(s) 102 stored locally in the IAC device 106, 206 (Step 304). If the destination DNS server is not one of the acceptable DNS servers 102, then the IAC device 106, 206 preliminarily blocks the outbound request (Step 306). In implementations which allow for an "exemption" file, The IAC device 106, 206 checks if such an exemption file is present and, if appropriate, there is a listed "exemption" for the user's request (Step 308). If this file is not present (or there is no listed "exemption" within it for the user's request), a content/tampering condition is triggered, resulting in activation of the appropriate notification light(s) 136 (Step 310). If this file is present (and, where applicable there is a listed "exemption" within it for the user's request), the specified DNS server will return the actual IP address of the user's desired website (Step 316) and the requested URL's content will be loaded (Step 318).

Alternatively, if an acceptable DNS server 102 is specified (Step 312), then such a DNS server 102 is able to query if the website requested by the user is a website 142 that contains objectionable content or a website 140 that contains acceptable content (specifically or by default) (Step 314). If the website is not considered a website 140 that does not contain objectionable content, then the DNS server 102 returns the actual IP address of the desired site (Step 316) and the requested URL's content will be loaded (Step 318) on the user's computer 116.

However, if the website requested is determined by the DNS server 102 as a website 142 that contains objectionable content, the DNS server 102 redirects the user's computer 116 to an alternate webpage, typically a notification page indicating that the original URL sought is blocked (Step 320). Depending upon the particular implementation, the web page to which the DNS server 102 redirects may be, for example, a page of the IAC device 106, 206 provider or it may alternatively (optionally) be the IP address of a virtual page within the IAC device 106, 206. In either case what is presented to the user should be a clear message indicating that the original URL sought is blocked for possessing objectionable content.

The IAC device 106, 206 monitors the information coming from the DNS server 102 and, in the case where a redirect has occurred recognized the redirect IP address and, thus, treats the redirect as an indication that objectionable content was sought. If the particular implementation does not incorporate an exemption file, a content/tampering condition is triggered, resulting in activation of the appropriate notification light(s) 136 (Step 326). In contrast, if the particular implementation incorporates the optional use of an exemption file before passing the redirected content to the user's computer 116, the IAC device 106, 206 will check for the exemption file (and, if appropriate, whether there is a listed "exemption" within it for the user's request) (Step 324). If there is no exemption file or listing within it for that website, the redirect notification is passed to the user's computer 116 and a content/tampering condition is triggered, resulting in activation of the appropriate notification light(s) 136 (Step 326).

If an exemption file is present (and, if appropriate, it contains an exemption for the particular website), a bypass protocol is invoked (Step 328) so that the desired website content can be accessed (Step 316) and its content passed on to the user's computer 116 (Step 318) as in the normal allowed case.

Depending upon the particular implementation, the bypass protocol (Step 328) can involve any number of approaches, the particular approach being one of design choice. For purposes of understanding, some representative example approaches could involve the following, again bearing in mind that these are not the only way to accomplish this bypass and any way of doing so is acceptable.

One representative example way to implement a protocol for the bypass is for the IAC device 106, 206 to contain an internal list of one or more non-filtering DNS servers which the IAC device 106, 206 can only access and to which it can only direct requests in such a bypass case. In this manner, the IP address returned from that DNS server will not indicate a block or trigger a content/tampering condition.

Another representative example way to implement a protocol for the bypass is, when a proper "exemption" exists, for the IAC device 106, 206 to be able to pass an "exemption indicator" to the Reporting and Control server 104 which, if it is also a DNS server, provides the requested content irrespective of content in place of the DNS server 102.

A related representative example way to implement a protocol for the bypass is, when a proper "exemption" exists, for the IAC device 106, 206 to be able to pass an "exemption indicator" to the Reporting and Control server 104 which will interact with some other non-blocking DNS server to access the requested website subject to the exemption and obtain the requested content.

Yet another representative example way to implement a protocol for the bypass is, when a proper "exemption" exists, for the Reporting and Control server 104 to provide an identifier for an alternate, non-filtering DNS server to the IAC device 106, 206, for example by temporarily overwriting the identifier of the acceptable DNS server 102 in a manner such that it is overwritten upon some specified next event, for example, delivery of the requested content to the user's computer 116 or, alternatively, upon a new URL being received.

Tampering by removing one or both of the connections to the interfaces 118, 120 can also be indicated. In the simplest case, the IAC device 106, 206 detects the loss of either or both connections using known means appropriate to the particular type of connection (which may involve use of one or more signals passing through the IAC device 106, 206 or some physical means, i.e. a mechanical switch, magnetic proximity detection, or any other suitable approach). Upon detecting the disconnection, a content/tampering condition is triggered in the IAC device 106, 206, resulting in activation by the IAC device 106, 206 of the appropriate notification light(s) 136.

Figure 4:
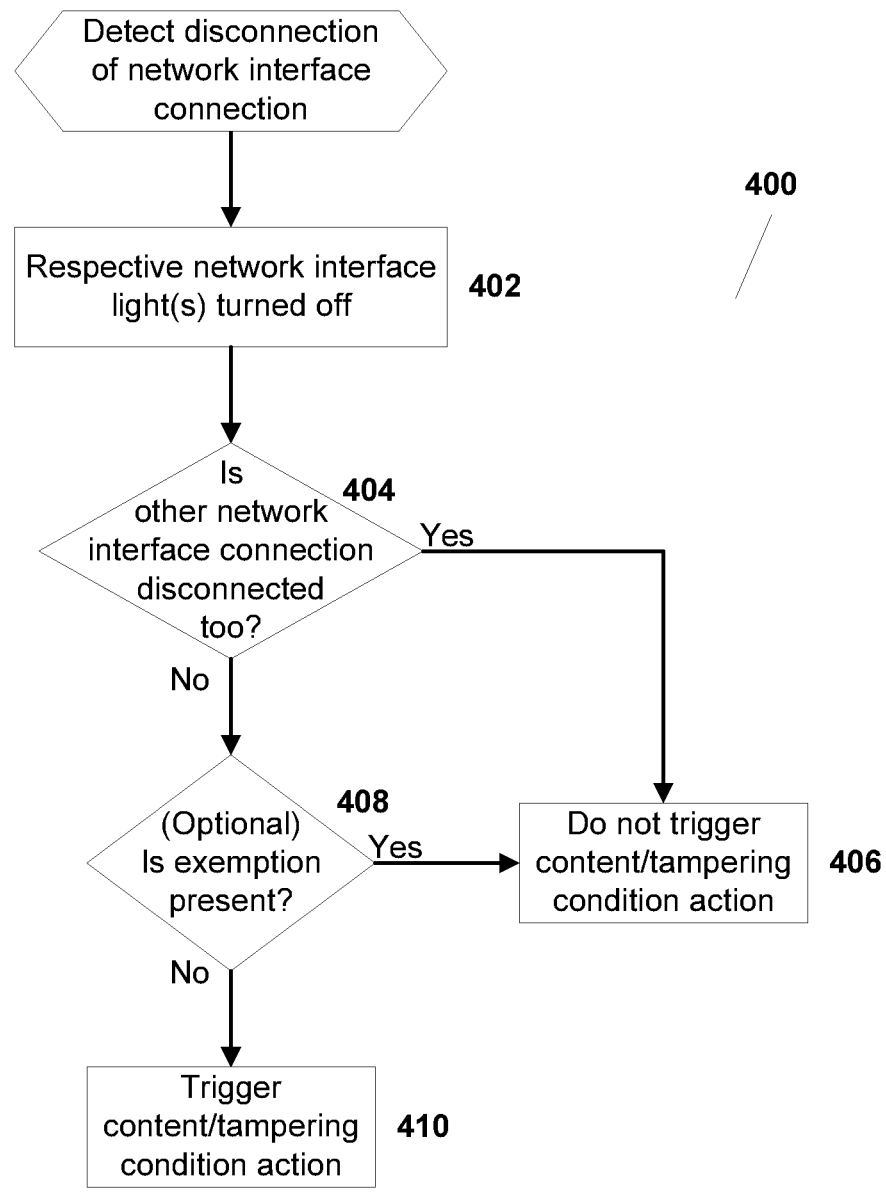
FIG. 4 is a simplified flow chart of one example overview of one process which is implemented via programming to trigger the light(s) when a user attempts to disconnect the connection to one of the interfaces of the IAC device.

Similarly, more complex detection and notification schemes can be used, for example where the IAC device also includes lights to indicate the presence of connections to the interfaces 118, 120. FIG. 4 is a simplified flow chart of one example overview of one process 400 which is implemented via programming to trigger the light(s) 136 when a user attempts to disconnect the connection to one of the interfaces 118, 120 of the IAC device 106, 206 in such an example case. When an unauthorized user removes the connection to either of the interfaces 118, 120, the IAC device 106, 206 detects the loss of the connection using known means appropriate to the particular type of connection (which may involve use of one or more signals passing through the IAC device 106, 206 or some physical means, i.e. a mechanical switch, magnetic proximity detection, or any other suitable approach). Upon detecting the disconnection, since the IAC device 106, 206 includes lights to indicate the presence of those connections, if the lights are lit or turned off by the making or breaking of the connection, the IAC device 106, 206 can detect this event or, in the case where the IAC device 106, 206 controls such lights, upon detecting the loss of the connection, the IAC device 106, 206 can de-activate the appropriate light(s) to visually indicate that such a connection was lost (Step 402). Irrespective, when the disconnection is detected, the IAC device 106, 206 optionally checks as to whether the both interfaces 118, 120 were disconnected or only the one first detected (Step 404).

For example, if the interface 118 is a WAN interface and it is disconnected while the interface 120, which is a LAN interface, is still connected, or if the LAN interface 120 is disconnected while the WAN interface 118 is still connected, the IAC device 106 will have been brought from a fully operational state down to a partially-functioning one, since it will only either (1) receive information form the user's computer 116, or (2) still be able to communicate with both the DNS server 102 and the Reporting and Control server 104, but not do both (1) and (2) on account of the single severed connection. The device makes an assessment of this change in situation, from function to partial-function (Step 404). Now it may be the case that the condition results from initial attachment of the IAC device 106. Thus, if the other interface was not already connected, then the IAC device presumes that this is an installation case and a content/tampering condition is not triggered (Step 406), since the IAC device 106, 206 was not just previously operational. However, if the IAC device 106, 206 was indeed just previously operational, then one of two things may occur. If the IAC device 106, 206 implementation includes use of an exemption file, following the function to non-function assessment, the IAC device will check to see if an appropriate exemption is indicated (Step 408) and, if so, a content/tampering condition will not be triggered (Step 406). If however, the implementation does not involve an exemption file or the appropriate exemption is not present in an implementation that allows for it, a content/tampering condition is triggered resulting in activation of the appropriate notification light(s) 136.

In a related vein, in some instances, an improper power down of the IAC device 106, 206 may be indicative of a tampering condition, or it may be useful to detect to simply notify the administrator of that fact. This improper power down situation can similarly be handled by the process of FIG. 4. To effect such detection, the IAC device 106, 206 will maintain some form of internal record (in its non-volatile storage 126) indicating the ongoing active connections to both interfaces 118, 120. Presuming an improper power down of the IAC device 106, 206 and that, at some time thereafter, power is restored to the IAC device 106, 206. Upon restoration of power to the IAC device 106, 206, the IAC device 106, 206 checks if both the interfaces 118, 120 (or their respective indicator lights) were active immediately prior to the loss of power. Such a check is performed, for example, by the IAC device 106, 206 inspecting the non-volatile storage 126 part of the memory 122 for information that is only present if both interfaces are active. For example, there may be a file for each interface 118, 120 such that each is present only when that interface is activated. Alternatively, there may be a single file that includes information for each interface 118, 120 that is present only when such interface is activated. Should the IAC device 106, 206 determine that each respective interface was not on prior to the power down, then the IAC device 106, 206 is presumed to have not been fully functional prior to the loss of power and so the power loss deemed not, in and of itself, an additional content/tampering event and a content/tampering event is not triggered.

However, if the inquiry result indicates that both interfaces 118, 120 were active, a content/tampering condition is triggered resulting in activation of the appropriate notification light(s) 136. Similarly, if the IAC device includes exemption file functionality, the IAC device 106, 206 can check for the existence of appropriate exemption information and, if it is not present, a content/tampering condition is triggered resulting in activation of the appropriate notification light(s) 136, but if it is present, a content/tampering condition is not triggered.

Any Internet-enabled device has the potential of being hacked by malicious users and steps are often taken by professionals or in devices to prevent this from happening. For example, many routers already on the market reduce the chance of the device being hacked from outside the user's network by only permitting the router to be controlled from within the user's network. However, the potential for malicious control is still possible from inside the network and so routers usually require the user to set up a username and password for access.

The instant approach and IAC device 106, 206 uniquely allows the owner of the IAC device 106, 206 some degree of control, but without the need to remember yet another user name and password and in a way that does not make the IAC device 106, 206 susceptible to hacking. Implementations of the IAC device 106, 206 described herein can be provided which cannot be accessed directly from inside or outside the user's own network.

As previously noted, the IAC device 106, 206 is configured to interact with a remotely located Reporting and Control server 104. As described herein, any operational changes affecting the IAC device 106, 206 (other than certain implementations (discussed below) which allow the reset component 108 to establish certain exemptions) must come from, or occur indirectly via, the Reporting and Control Server 104. This approach is essentially the only way the behavior of the IAC device 106, 206 can be altered, because the internal operational programming is not changeable (if even addressable) via the interfaces 118, 120, 144, 244.

Figure 5:
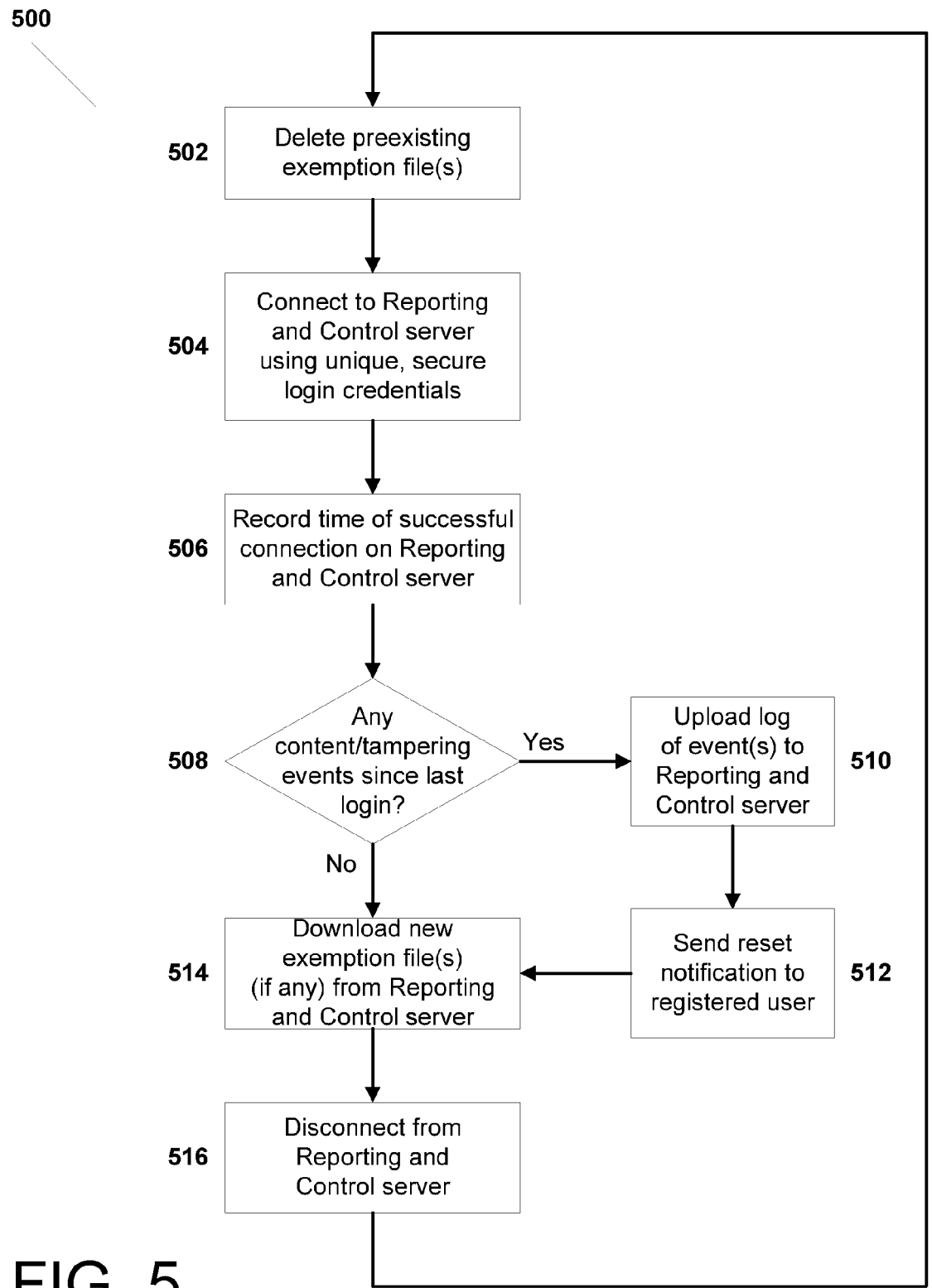
FIG. 5 is a simplified flow chart of an example process relating to some of the possible interactions between the IAC device and the Reporting and Control Server.

With this in mind, certain behaviors of the Reporting and Control server 104 and its interaction with the IAC device 106, 206 will now be described herein. FIG. 5 is a simplified flow chart of an example process 500 relating to some of the possible interactions between the IAC device 106, 206 and the Reporting and Control Server 104.

Ideally, this process 500 is executed periodically, and more specifically at relatively short, regular intervals that are sufficient to accomplish what is required without causing undue taxing of the IAC device 106, 206 or the Reporting and Control Server 104, for example, every five minutes, the specific interval selection however being an implementation choice unnecessary for understanding the principles of operation.

The process 500 within an interval generally begins with the clearing of preexisting exemption file(s) present in the IAC device's memory 122 (Step 502). Depending upon the particular implementation, all exemption files can be cleared or, in some implementations, exemption files can have a specified life (as measured, for example, by number of cycles through this process 500) and are cleared when their specified life ends. Thus, the periodicity of this process can determine the duration that any particular exemption(s) may be effective. The process 500 then continues with the IAC device 106,

206 connecting to the Reporting and Control Server 104 using secure login credentials (ideally unique to the IAC device 106, 206) and permanently stored in the memory 122 of the IAC device 106, 206 (Step 504). These credentials used to authenticate the IAC device 106, 206 to the Reporting and Control Server 104 are not made available to the owner of the device nor need they be recognizable as any form of credentials to anyone or thing other than the Reporting and Control server 104. In short, the credentials are purely for the automated authentication. Moreover, to prevent "spoofing" (the known practice of one device containing or passing information so as to make it appear that the identity of the actual device or user is other than what it is), the credentials can be, for example, simply some permanently stored information which the Reporting and Control Server 104 will be expecting, an algorithm which must be applied by the IAC device 106, 206 to something sent by the Reporting and Control Server 104 with the result being returned to the Reporting and Control Server 104 to be compared to an expected result, some value provided by the Reporting and Control Server 104 the last time it was connected to by the IAC device 106, 206, or any other authentication approach the implementer desires, the important aspect being that the IAC device can uniquely authenticate itself to the Reporting and Control Server 104, not the way in which that authentication is accomplished.

Upon the IAC device 106, 206 successfully connecting and authenticating itself to the Reporting and Control Server 104, the server 104 records the current time as being the most recent contact made with the IAC device 106, 206 (Step 506). Advantageously, this time information can be used in reports sent to the owner/administrator of the IAC device 106, 206 to inform them regarding operation of the IAC device 106, 206. The IAC device 106, 206 then checks whether a content/tampering event has been triggered since the last communication with the Reporting and Control Server 104 (Step 508).

If a content/tampering event was triggered since the last time the process 500 was executed, then a log of the content/tampering event(s) is uploaded from the IAC device 106, 206 to the Reporting and Control Server 104 (Step 510). The process by which this log is created and example contents will be described later in connection with FIG. 7 and FIG. 8.

The uploading of the log to the Reporting and Control Server 104 results in the Reporting and Control Server 104 sending a notification to the registered owner/administrator (Step 512). The registration process will be described later, but suffice it to say that one result of that process is that the owner/administrator will provide an avenue for contact, typically an e-mail address or cell phone number to which an SMS message may be sent, for purposes of receiving such notifications. The notification will typically contain certain information identifying an event has occurred (and, if the implementation allows, further details such as the kind of event triggered, log contents, the time that the IAC device 106, 206 last communicated with the Reporting and Control Server 104, etc.), as well as information relating to effecting a reset which will turn off the notification light(s) 136 of the IAC device 106, 206. Various processes by which the reset can be effected will also be explained later.

Depending upon the particular implementation, the notification can also include a unique temporary code that when received back by the Reporting and Control Server 104 in a specified manner will result in production of an exemption file on the Reporting and Control Server 104 that can be downloaded into the IAC device 106, 206.

Similarly, as an aside, implementations can be constructed whereby an owner/administrator can trigger a special notice to be sent by the Reporting and Control Server 104, or can send certain information to the Reporting and Control Server 104, such that a temporary exemption file will be created without a content/tampering event having been triggered. In doing so, the owner/administrator can be provided with a secure, but password-free temporary means to affect the operation of the IAC device 106, 206 and permit, for example, the IAC device 106, 206 to be unplugged or powered off without being considered an act of tampering.

Returning to the process 500, irrespective of the reason, if an exemption file is present on the Reporting and Control Server 104, the exemption file(s) can be downloaded to the IAC device 106, 206 (Step 514). Again, advantageously, this check for an exemption file for downloading can be performed even if there was no triggering event.

The downloading of the exemption file removes the exemption file from the Reporting and Control Server 104 such that a new file would need to specifically be created or, in the owner/administrator-initiated case, consciously authorized by for any subsequent run(s) of the process 500.

After downloading any existing exemption file(s), the IAC device 106, 206 then disconnects from the Reporting and Control Server 104 (Step 516) and the process waits for the specified time period before repeating by the IAC device 106, 206 again deleting, as necessary, the appropriate preexisting exemption file(s) (Step 502).

Figure 6:
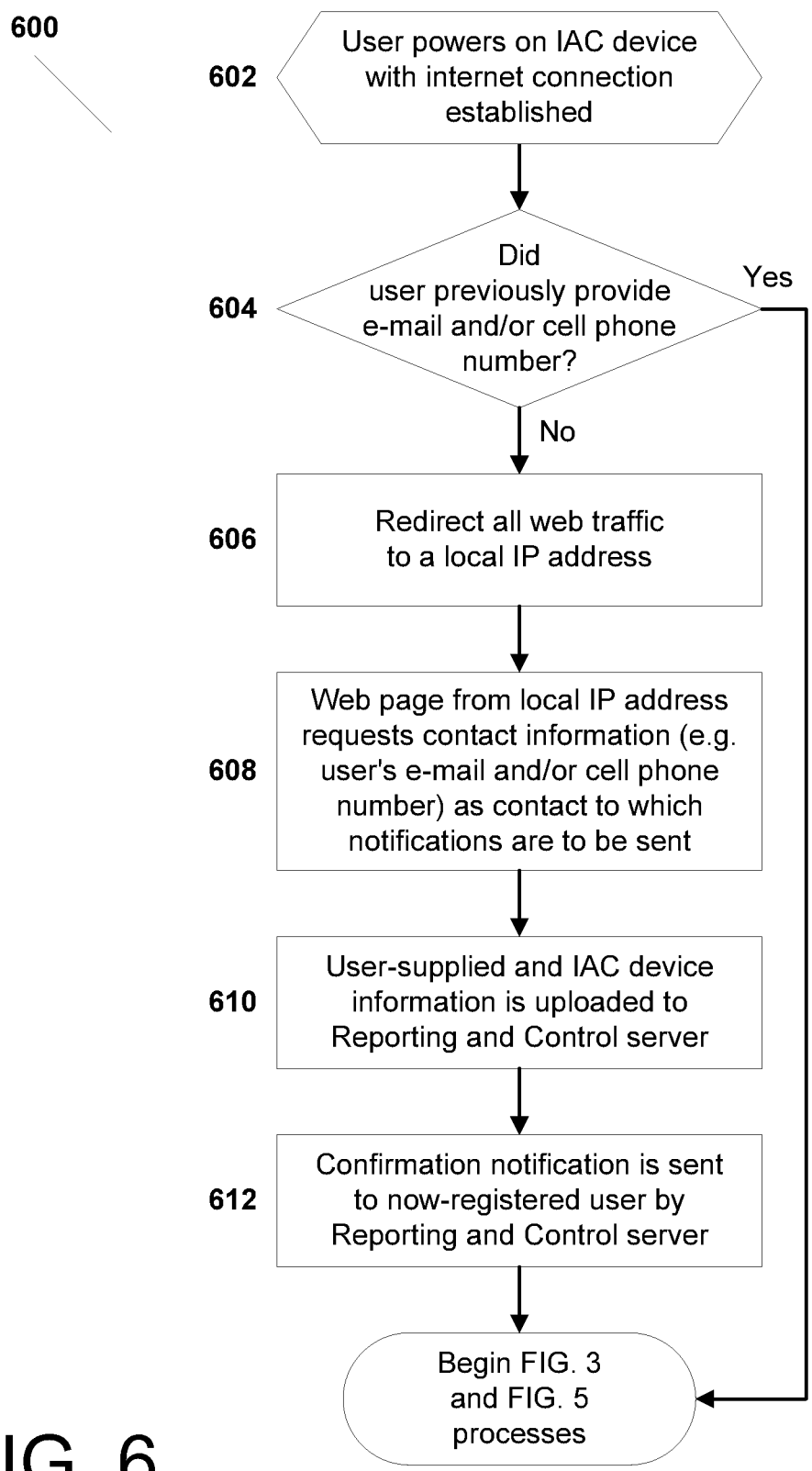
FIG. 6 is a flow chart illustrating, in simplified fashion, a representative example of another process by which the owner of the system can register an IAC device.

FIG. 6 is a flow chart illustrating, in simplified fashion, a representative example of another process 600, in this case the process 600 by which the owner of the system can register an IAC device 106, 206 such that it can be used as described herein. The process 600 presumes that the IAC device 106, 206 has already been connected between the user's computer(s) 116 and the modem 112, such as shown in FIG. 1 or FIG. 2 so that there is a connection to the Internet 110 available via the modem 112.

To preserve the ease and simplicity, the process 600 begins thereafter upon powering on for the first time (Step 602). The IAC device 106, 206 checks if a registration has previously occurred, such that at least an e-mail address and/or cell phone number has been previously provided (Step 604) to be used for notification reporting. In one implementation, this check may be performed by simply looking for the existence of a file (and/or certain file contents) or other indicator being present in the system's memory 122 or it may involve the IAC device 106, 206 automatically initiating a connection to the Reporting and Control server 104 such that the Reporting and Control server 104 can be involved in the process 600 as it occurs, and may also therefore optionally involve owner-supplied information being transferred to and stored by the Reporting and Control server 104. Thus, if the owner of the device had not previously supplied the required information, then no such indicator, file (or information) would exist in memory 122 or the Reporting and Control server 104. If no notice contact information had previously been provided (e.g. there is e-mail or cell phone number logged), outbound web traffic to the Internet 110 is redirected to force registration (Step 606). This may entail redirection to a "locally" hosted webpage (i.e., in the IAC device 106, 206 or served by the Reporting and Control server 104) or display of some other type of form through which the user can enter the necessary information.

Via the webpage (or other means), the user is prompted to provide certain information, at a minimum including the information necessary for the Reporting and Control server 104 to provide its notification(s) (Step 608).

Depending upon the particular implementation, some or all of the user's input may be preserved in non-volatile storage of the IAC device 106, 206 memory 122, but at least the notice-related contact information will be uploaded via the IAC device 106, 206 to the Reporting and Control Server 104 (Step 610) for later use. In addition, optionally, prior to or in conjunction with, the uploading of this information, the specific IAC device 106, 206 will be identified to the Reporting and Control server 104 so that it will recognize that IAC device in the future. In this manner, this further reduces the possibility of hacking because some implementations of the Reporting and Control server 104 can be structured such that only an IAC device 106, 206 can communicate with it via the Internet 110 and only in a limited fashion. Following receipt of the notice-related contact information by the Reporting and Control Server 104, a confirmation notification is then sent to the user from the Reporting and Control Server 104 (Step 612). This confirmation notification allows the owner/administrator to know that the IAC device 106, 206 is now active. In addition, confirmation notification can optionally be set up such that, for the registration to be complete, it will require a specific action be performed by the owner/administrator. In this way, the actions required to effect a user notification based reset operation can be mimicked and thereby act as a test of a way that the user can cause the Reporting and Control Server 104 to effect a reset of the light(s) 136 of the IAC device 106, 206. Following the sending of the confirmation notification (and optional receipt of an indication that the optional specified action by the user has been taken), the processes of FIG. 3 and FIG. 5 will be enabled for this IAC device 106, 206.

Figure 7:
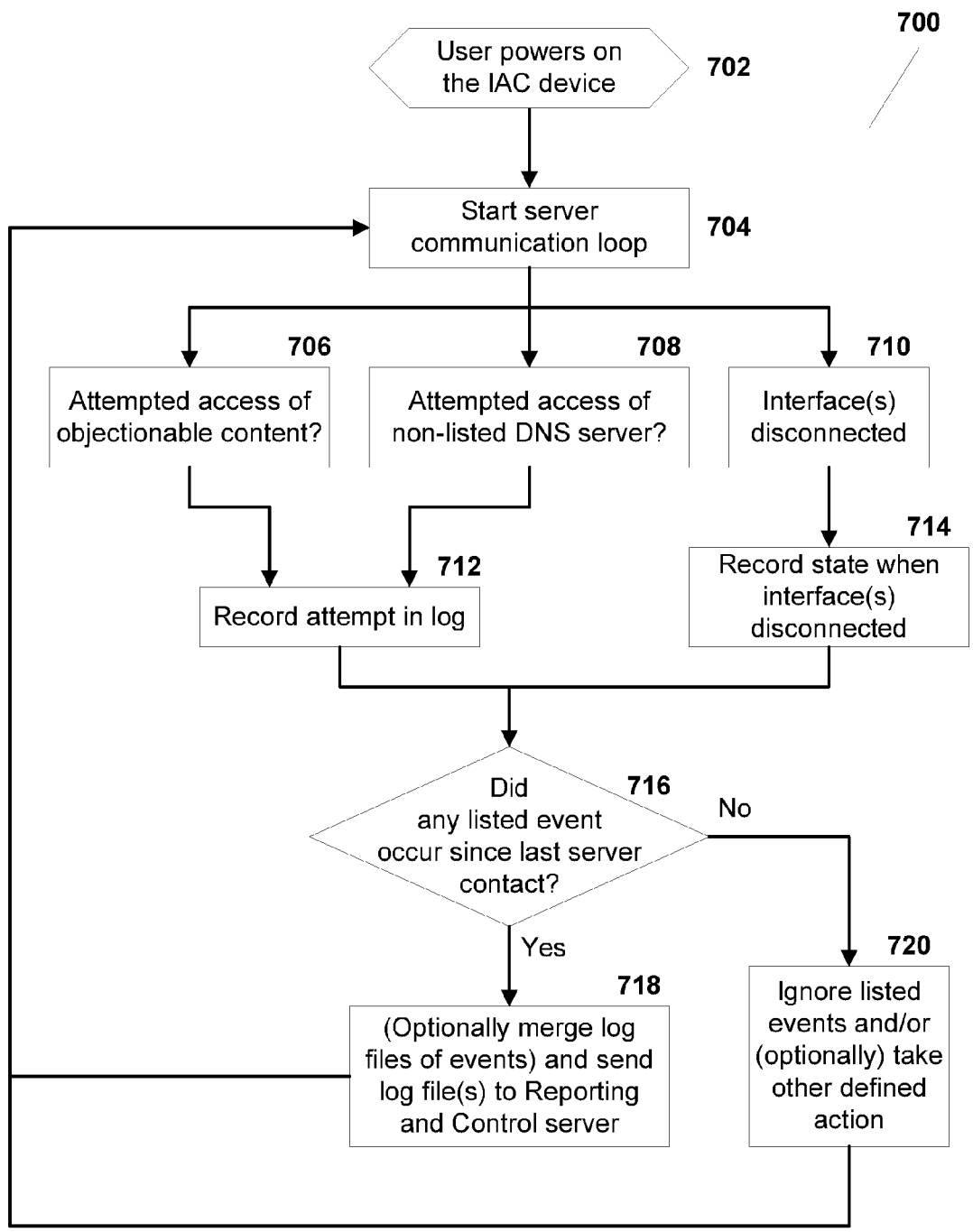
FIG. 7 is a flow chart illustrating, in simplified fashion, a representative example of another process describing the means by which an event-related log or notice report is generated.

FIG. 7 is a flow chart illustrating, in simplified fashion, a representative example of another process 700 describing the means by which an event-related log or notice report is generated. The process 700 can begin once the IAC device 106, 206 is powered on (Step 702) which initiates the start of a server communication loop (Step 704). In general, it should be noted that, with some implementations, the bulk of this process 700 can occur immediately preceding Step 510 of process 500 (FIG. 5). In some other implementations, it can occur any time between the periodic communication between the IAC device 106, 206 and the Reporting and Control Server 104.

As shown in FIG. 7, there are several example events which could occur and would trigger a content/tampering event. For ease of explanation, these events are shown in parallel but it should be understood that some or all of these events could occur sequentially and one or more might never occur at all; ordering is inconsequential. In addition, for simplicity, the handling of each is shown in a single process 700, but it should also be understood that the handling of the different events could be separated among two or more discrete or interrelated processes.

Specifically, as shown in FIG. 7, there are three events that could occur and thereby trigger a content/tampering event: attempted access of objectionable content (Step 706); attempted access of a non-listed (e.g. non-authorized or non-filtering) DNS server (Step 708); an interface disconnection (Step 710). If there is an attempted access of objectionable content or attempted access of a non-listed (e.g. non-authorized or non-filtering) DNS server, in addition to any other actions which may occur, this process 700 proceeds to record the event (and, depending upon the implementation, possibly other associated information to the extent provided for and available, like date, time, URL sought, DNS server attempted to be connected to, originating computer, etc.) in a log file stored in the system's memory 122. Similarly, if the event was an interface disconnection, pertinent state (and if the IAC device 106, 206 implementation supports it, other information like, time of disconnection) will be logged (Step 714). A check is then performed (Step 716) to determine whether any of these logged events occurred since the last communication between that IAC device 106, 206 and the Reporting and Control Server 104. If any logged event occurred since the most recent server communication, the log file(s) will be uploaded to the Reporting and Control Server 104, and the loop will return to its beginning (Step 704). If the implementation involves two or more separate logs, the logs can be merged (Step 718) prior to uploading and return to the beginning (Step 704). As noted above, depending upon the particular implementation, information from the log file(s) can thus be included with the notification sent by the Reporting and Control Server 104 to the registered owner/administrator. If however, none of the logged events occurred since the last communication between that IAC device 106, 206 and the Reporting and Control Server 104, the listed events can be ignored and/or the IAC device 106, 206, the Reporting and Control Server 104, or both, can take some other defined action of the implementer's choosing (step 720). Again, thereafter, the loop will return to its beginning (Step 704).

Figure 8:
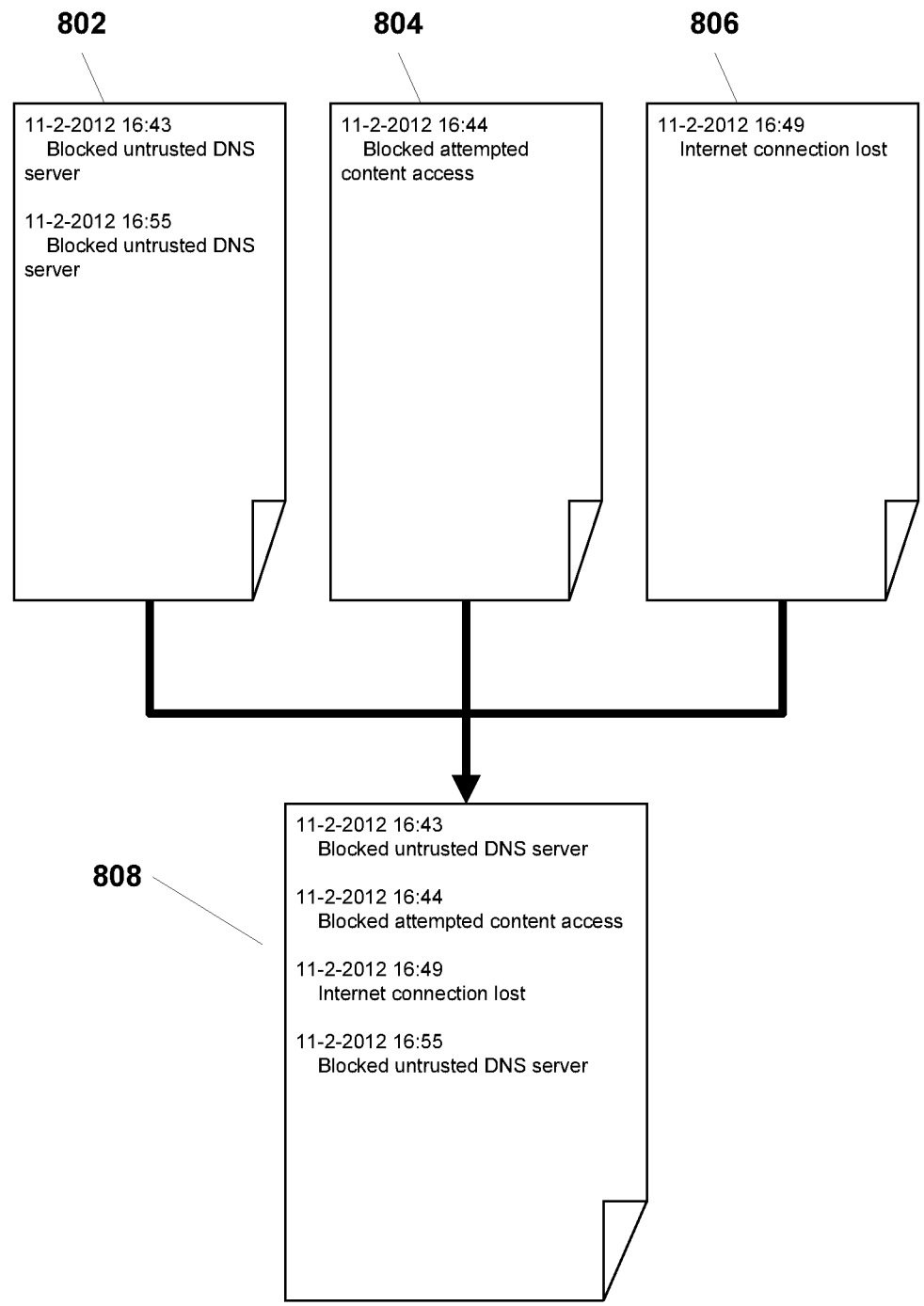
FIG. 8 illustrates, in simplified form, a representative example of implementation wherein separate log files are created and maintained.

FIG. 8 illustrates, in simplified form, a representative example implementation wherein separate log files 802, 804, 806 are created and maintained (Step 706, Step 708, Step 710) for each of the three events identified in FIG. 7. By way of example, file 802 shows a hypothetical example log for attempts to circumvent the chosen DNS server 102 which occurred on Nov. 2, 2012 at 4:43 pm and 4:55 pm. File 804 shows a hypothetical example log that recorded an attempt to access objectionable content on that same day at 4:44 pm, while file 806 shows a log having a hypothetical entry recording an instance when the IAC device 106, 206 lost a connection to the Internet, possibly due to an improper disconnection of the interface 118 of the IAC device 106, 206.

As noted above, some implementations can have the individual logs each separately uploaded to the Reporting and Control Server 104. However, as also noted, with some implementations it may be desirable to merge two or more of the log files into a single file 808 for uploading. Depending upon the particular implementation, the files can be merged by simply appending their contents one after the other or, in cases where the date and/or time is optionally available, they can be interspersed as necessary to reflect the events in time-sequence order such as shown in file 808. Where a merged file is created, the merged file 808 is typically what would be uploaded to the Reporting and Control Server 104 and may be kept or not in the memory 122 of the IAC device as desired for the particular implementation.

Having described various details of how the IAC device 106, 206 operates and how it interacts with a Reporting and Control server 104 to effect content filtering and/or tamper control, the operation of those devices with respect to resetting after an event which triggers a content/tampering condition, resulting in activation of the appropriate notification light(s) 136 will now be discussed.

As noted above, in conjunction with the triggering of a content/tampering condition, the Reporting and Control server 104 will send a notification via the contact method provided as part of the registration process. For events that involve interaction between the IAC device 106, 206 and Reporting and Control server 104 which the Reporting and Control server 104 can directly detect, the Reporting and Control server 104 can automatically proceed with the notification process. However, depending upon the particular implementation, there may be instances where the event cannot be directly recognized by the Reporting and Control server 104, for example, disconnection of the interface between the IAC device 106, 206 and a user computer 116. To handle such cases, the IAC device 106, 206, when such an event happens, is configured to automatically contact the Reporting and Control server 104 and report the event, thereby allowing the Reporting and Control server 104 to send the requisite notification.

Alternatively, with some implementations, the hardware of the IAC device 106, 206 will be set up such that the lighting of any notification light(s) 136 will result in some form of communication back to the Reporting and Control server 104, ideally identifying the event or, alternatively, a code indicating the light(s) 136 turned on so that the Reporting and Control server 104 can discern what the event was.

Figure 9:
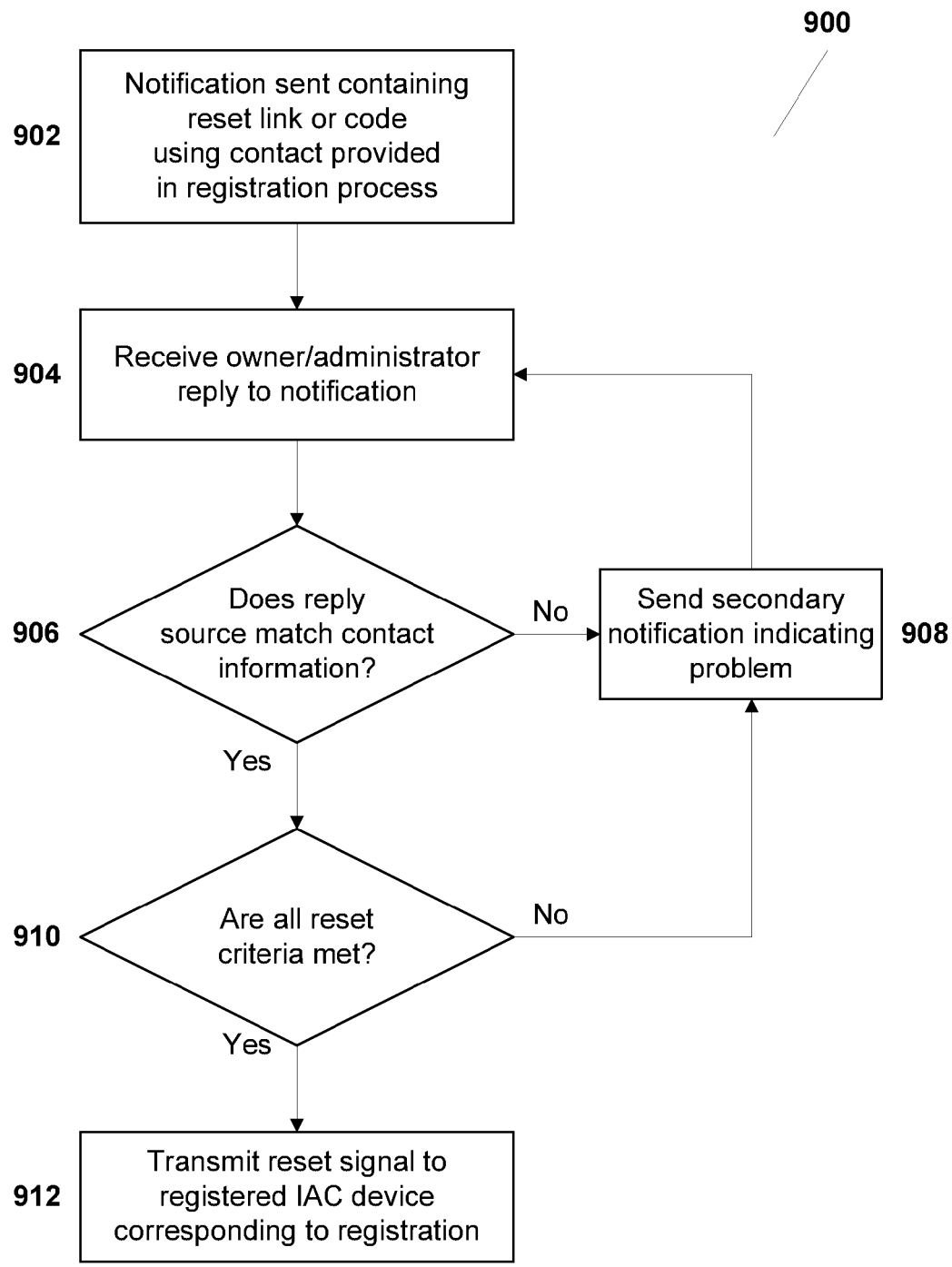
FIG. 9 is a simplified flowchart for the notification and reset process.

Whatever the basis for the event and way the Reporting and Control server 104 learns of its existence, as noted above, the Reporting and Control server 104 constructs a notification which will be sent via the contact method provided during registration and may incorporate a way to cause the Reporting and Control server 104 and/or IAC device 106, 206 to effect a reset of the event-indicating light(s) 136. Depending upon the particular implementation, there are different forms this can take. Each will be described with reference to FIG. 9, which is a simplified flowchart for the notification and reset process 900.

In one example implementation approach, the contact would be via the sending of an e-mail to the notice e-mail address provided during registration (Step 902). The e-mail would include an embedded code and, to effect a reset, the recipient would be required to reply to that e-mail from that same e-mail account. At some point thereafter, the Reporting and Control server 104 should receive a reply as requested (Step 904). Upon receipt, the Reporting and Control server 104 will check to make sure that the reply came from the same e-mail account that it was sent to (Step 906) in order to reduce the possibility that the reply is coming from an unauthorized person. If the reply did not come from the same e-mail account, the Reporting and Control server 104 can send a secondary notification (Step 908) optionally indicating the problem and giving the recipient an opportunity to remedy it by replying again (depending upon the particular implementation) by properly replying to the first e-mail or by replying to the secondary notice as indicated.

If the e-mail account source for the reply does match the e-mail account in the registration, the Reporting and Control server 104 will check to make sure that the reply or other required action or information satisfies any other reset criteria (Step 910). By way of representative (non-limiting) examples, "does it include some other information that the recipient was required to include", "did it come after too much time has elapsed" or "was any required prerequisite action taken." If all reset criteria are not met, a secondary notification can be sent as indicated above (Step 908). However, if all reset criteria, are met a reset signal or code will be sent by the Reporting and Control server 104 to the IAC device 106, 206 which will, depending upon the particular implementation, directly reset the light(s) 136 or cause the IAC device 106, 206 to do so.

In another example implementation approach, the contact would be via the sending of an SMS text message to the notice phone number provided during registration (Step 902). The SMS text message would similarly include an embedded code and, to effect a reset, the recipient would be required to reply to that SMS text message from that same phone number. At some point thereafter, the Reporting and Control server 104 should receive a reply as requested (Step 904). Upon receipt, the Reporting and Control server 104 will check to make sure that the reply came from the same phone number that it was sent to (Step 906) in order to reduce the possibility that the reply is coming from an unauthorized person. If the reply did not come from the same phone number, the Reporting and Control server 104 can send a secondary notification (Step 908) optionally indicating the problem and giving the recipient an opportunity to remedy it by replying again to the secondary notice.

If the phone number source for the SMS text reply does match the phone number in the registration, the Reporting and Control server 104 will check to make sure that any other required reset criteria are met (Step 910) as noted above. If not, a secondary notification can be sent as indicated above (Step 908). However, if all reset criteria are met, a reset signal or code will be sent by the Reporting and Control server 104 to the IAC device 106, 206 which will, depending upon the particular implementation, directly reset the light(s) 136 or cause the IAC device 106, 206 to do so.

In yet another example implementation approach, the contact would again be via the sending of an e-mail to the notice e-mail address provided during registration (Step 902). However, in this case, the e-mail would include an embedded link to a URL or IP address and, to effect a reset, the recipient would be required to click on that link as the "reply." The embedded URL or IP address will be for the Reporting and Control server 104 or a web server associated with it and the link may also include a unique identifier which can be forwarded to or and/or used by the Reporting and Control server 104 and may further identify, for example, the particular IAC device 106, 206 and/or registered account which should be reset. At some point thereafter, the Reporting and Control server 104 should receive the reply resulting from the user selecting the embedded link (either directly or via some other web server) (Step 904). As discussed above, upon receipt, the Reporting and Control server 104 will check to make sure that there is a source match (e.g. the link came from the right server and/or the proper unique identifier has been passed) (Step 906). If there is a source mismatch, the Reporting and Control server 104 can send a secondary notification (Step 908) optionally indicating the problem and giving the recipient an opportunity to remedy it.

If the reply does match, the Reporting and Control server 104 will check to make sure that all reset criteria are met (Step 910). If all reset criteria are not met, a secondary notification can be sent as indicated above (Step 908). However, if all reset criteria are met, a reset signal or code will be sent by the Reporting and Control server 104 to the IAC device 106, 206 which will, depending upon the particular implementation, directly reset the light(s) 136 or cause the IAC device 106, 206 to do so.

In a still further example implementation approach, the contact would again be via the sending of an SMS text message to the phone number provided during registration (Step 902). However, in this case, the SMS text message would include the embedded link as described above and the recipient would be required to click on that link as the "reply." The process would then continue as described above and, if all required criteria are satisfied, a reset signal or code will be sent by the Reporting and Control server 104 to the IAC device 106, 206 which will, depending upon the particular implementation, directly reset the light(s) 136 or cause the IAC device 106, 206 to do so.

For implementations which incorporate a reset component 108, the above approaches could still be used, alone or in conjunction with the reset component 108, or merely using the reset component 108. These adjuncts or alternatives will now be explained with reference to various possible representative examples of the way it can be used.

In implementations involving the simplest example reset component 108 case, the reset component 108 could simply be a passive device which contains hard-wired or permanently stored information and, when its interface 146, 246 and the corresponding IAC device 106, 206 interface 144, 244 are coupled, is read by the IAC device 106, 206. During the original registration process, the reset component 108 may need to be present and, as part of the registration process, the information from the reset component 108 will be read by the IAC device 106, 206 and passed to the Reporting and Control server 104 for storage and use at a later time.

Then later, if a reset is required, the notification can request, as a reset criteria, that the reset component be coupled to the IAC device 106, 206 in order to effect a reset. In such a case, the reset component 108 will be read and its stored information sent to the Reporting and Control server 104 where the information can be compared to the information stored in the Reporting and Control server 104 at the time of registration and, if the two match, it will be deemed a satisfaction of a criterion required for reset. Upon satisfaction or sending of the reset signal by the Reporting and Control server 104, the information sent from the reset component 108 will be deleted, so that it will need to be presented again if a reset is required in the future.

Alternatively, some implementations involving the reset component may involve the Reporting and Control server 104 sending a notification that does not contain any code or link. Rather, it merely tells the recipient that coupling of the reset component 108 is required (perhaps within a specified time). When that happens, implementations of the IAC device 106, 206 employing this approach, will automatically read the reset component 108 and send the necessary information to the Reporting and Control server 104. Since the Reporting and Control server 104 will have a record of a notification having been sent, receipt of the information from the reset component 108 via the registered IAC device 106, 206 associated with it will result in a reset signal or code being sent by the Reporting and Control server 104 to the IAC device 106, 206 which will, depending upon the particular implementation, directly reset the light(s) 136 or cause the IAC device 106, 206 to do so.

Other implementations involving a reset component 108 can employ more complicated or sophisticated actions before the reset code or signal will be sent. For example, with one implementation, the information contained within the reset component 108 may need to be manipulated in some fashion by the IAC device 106, 206 before being sent. By way of example, the information read from the reset component 108 may need to be arithmetically or logically combined with some value in the IAC device 106, 206 and the result sent to the Reporting and Control server 104, or it may be used as part of a hashing scheme which will be used to determine what information is sent to the Reporting and Control server 104, or it may need to be algebraically or mathematically manipulated by the IAC device 106, 206 directly or using temporary information provided by the Reporting and Control server 104.

Still other implementations involving a reset component 108 that must be physically connected to the IAC device 106, 206 because the reset component contains all or part of the circuitry needed for reset such that a reset can only be effected if the reset component 108 is attached when the reset code or signal is received at the IAC device 106, 206.

With yet other implementations, there may be no need for involvement of the Reporting and Control server 104 after the notification is sent because the reset component 108 does not contain any specific code or value, but rather is uniquely paired with or must uniquely interact with the particular IAC device 106, 206 in some particular way such that another reset component 108 will not work to effect a reset, only the one that came with that particular IAC device 106, 206 will.

In still other implementations, involving a reset component 108 with some processing capability, the reset component 108 will incorporate some functional aspects that might otherwise be handled by the Reporting and Control server 104. For example, the reset component 108 can be programmed to download logs from the IAC device 106, 206 so that they can be accessed by the owner or administrator using a computer for viewing, in addition to, or in lieu of, sending out an e-mail or SMS.

In yet other implementations, the presence of the reset component 108, if coupled to the IAC device 106, 206, can serve as the exemption "file", or establish the exemption condition referred to in connection with, for example, FIG. 3 and FIG. 4. Again, this could be in addition to, or in lieu of, the exemption condition coming from a communication between the IAC device 106, 206 and the Reporting and Control server 104.

In addition, in some implementations involving a reset component 108 that does not require physical attachment, such as described in connection with FIG. 2, the IAC device 206 can be configured such that, when the reset component 108 is present it automatically creates an exemption condition (full or partial) in the IAC device 206. Depending upon the particular implementation, some such implementations can give the owner/administrator some measure of control over the amount/type of exemption. For example, some implementations might include software that the owner/administrator can load onto their computer that provides a simplified interface (for example basic check boxes or highlighting) whereby the owner/administrator can establish what exemption(s) will apply when the reset component 108 is present—for example, to allow access to a particular website (irrespective of content, like certain search engines, even though the user will not be able to access certain sites returned in the search results) or a non-filtering DNS server. Where this is the case, a subset of such implementations may still restrict the access of the owner or administrator by only allowing for certain specific exemptions to be set and/or may still require uploading the exemptions set in this manner to the Reporting and Control server 104 (where they can be validated or overridden) for subsequent downloading to the IAC device 206, whereas another subset of such implementations will allow for direct transfer of such established exemptions from the reset component 108 to the IAC device 206.

As should now be appreciated, advantageously none of these administration and/or reset approaches require the user or administrator to separately maintain another username/password combination relating to Internet content filtering except possibly the one they use for the designated e-mail account already, and none require more than a nominal facility with computer devices to deploy and use effectively. Thus, the foregoing represents an inexpensive approach whereby an average consumer or person who is not computer-savvy can, with some implementations, purchase an inexpensive "black box" device that they can simply attach between their computer and modem and, following a simple registration process, have "turn key" filtering of objectionable content, simple and effective visual notification on the device itself when someone attempts to access objectionable content, and easy control over reset of the visual notification.

Finally, while the foregoing example implementations have been discussed such that a disallowed event (i.e. an attempt to access objectionable content, an attempt to circumvent the specified DNS server, a tampering event, etc.) will allow the user to continue to access the Internet 110 through the IAC device 106, 206 with any lit light(s) 136, it should be understood that implementations can straightforwardly be constructed that also preclude further usage following a disallowed event for a specified period of time or until a reset has occurred.

It should be understood that this description (including the figures) is only representative of some illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments incorporate the same principles of the invention as claimed and others are equivalent.

What is claimed is:

1. An apparatus for managing a user's ability to access certain Internet content comprising:
   a reporting and control server;
   an Internet Access Control (IAC) device remote from the reporting and control server, the IAC device having a first interface, a reset interface, and a second interface,
      the first interface being coupled to a modem of the user the modem thereby providing a connection between the IAC device and each of the Internet and the reporting and control server,
      the second interface being coupled to a router through which access to the Internet may be sought by at least one computer,
      the IAC device having a processor to execute internal programming stored in memory of the IAC device and control to control its operation, the internal programming and control being inaccessible and unchangeable except via actions communicated by the reporting and control server,
      the IAC device only being able to communicate with the reporting and control server via the Internet through the modem,
      the IAC device including at least one light having an illuminated state and a non-illuminated state, and visible to a person from a distance external to the IAC device when the at least one light is in the illuminated state, the at least one light being switchable between the illuminated state and the non-illuminated state, the illuminated state conspicuously indicating on the IAC device when at least one disallowed event has occurred,
      the IAC device being connectable to a DNS server via the first interface, so that the IAC device can interact with the DNS server and determine whether a disallowed event has occurred and, if so, the IAC device will interact with the reporting and control server to cause issuance by the reporting and control server of a notification of an existing disallowed event; and
   a reset component removably coupleable to the reset interface of the IAC device which, when coupled to the IAC device while the at least one light is in the illuminated state, will result in the IAC device causing the at least one light to be switched from the illuminated state to the non-illuminated state.

2. The apparatus of claim 1 wherein the reset component is coupleable to the IAC device through physical coupling.

3. The apparatus of claim 1 wherein the reset component is coupleable to the IAC device through capacitive coupling.

4. The apparatus of claim 1 wherein the reporting and control server provides reset information to the IAC device.

5. The apparatus of claim 1 wherein the at least one light comprises multiple lights which can be used to differentiate among different types of events.

6. The apparatus of claim 5, wherein at least some of the multiple lights are used to discretely and uniquely identify a specific type of event.

7. The apparatus of claim 1, wherein the IAC device must manipulate information obtained from the reset component and communicate a result of the manipulation to the reporting and control server before the reset of the at least one light can occur.

8. The apparatus of claim 7, wherein the manipulation is at least one of an algebraic manipulation, a logic manipulation, or a hashing manipulation.

9. The apparatus of claim 1 wherein the IAC device detects at least one type of disallowed event.

10. A method of managing a user's ability to access certain Internet content, via a computer, using an IAC device connected between (i) a router coupled to at least one user's computer and (ii) a modem connected to the Internet, the method comprising:
    receiving, at the IAC device, a web address from the at least one user's computer, via the router, requesting content to be obtained via the modem from a website, indicated by the web address;
    determining, using the IAC device, whether a requested Domain Name System (DNS) server to which the web address is directed corresponds to at least one DNS server that is identified in storage as an acceptable DNS server so that
       (i) if the requested DNS server is not identified in the storage as acceptable, the web address will be blocked, and
       (ii) if the requested DNS server is identified in the storage as acceptable, the web address will be sent to the acceptable DNS server via the modem;
    determining, using the IAC device, whether an IP address provided by the acceptable DNS server is a redirect IP address and, if the IP address is the redirect IP address, indicating that an objectionable content event has occurred by changing at least one light on the device from a normal state to an objectionable content event-indicating state;
    sending, using the IAC device, information to a reporting and control server, via the modem, so that the reporting and control server can issue a notification to a registered notification recipient for the IAC device requiring the registered notification recipient to take some action to cause the reporting and control server to transmit a reset;
    receiving, at the IAC device, the reset from the reporting and control server, and
    following the IAC device receiving of the reset, resetting the at least one light on the IAC device from the objectionable content event-indicating state to the normal state.

11. The method of claim 10 wherein, when the IP address is a redirect IP address, the method further comprises:
    determining whether an applicable exemption is present.

12. The method of claim 10 wherein the at least one light on the IAC device comprises multiple lights and the method further comprises:

illuminating a set of lights in a pattern identifying a specific type of event has occurred.

13. The method of claim 10 further comprising:
following the sending, interfacing with a reset component prior to the resetting.

14. The method of claim 13 further comprising:
manipulating information obtained from the reset component prior to the sending.

15. The method of claim 10 further comprising:
downloading an exemption file from the reporting and control server.

16. The method of claim 10 further comprising, maintaining within the IAC device an identification of at least two acceptable DNS servers.

17. The method of claim 10 wherein the sending comprises:
the IAC device providing authenticating information to the reporting and control server.

18. The method of claim 10 wherein the method comprises:
only allowing changes to internal programming or control of the IAC device through actions of the reporting and control server.

19. The method of claim 10 further comprising:
maintaining a log of events in the IAC device.

20. The method of claim 19 further comprising:
uploading the log of events from the IAC device to the reporting and control server.

* * * * *